United States Patent
Chae et al.

(10) Patent No.: US 10,368,352 B2
(45) Date of Patent: Jul. 30, 2019

(54) DATA TRANSMISSION METHOD AND APPARATUS BY DEVICE TO DEVICE TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Byounghoon Kim, Seoul (KR); Myoungseob Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/248,588

(22) Filed: Jan. 15, 2019

(65) Prior Publication Data
US 2019/0150146 A1    May 16, 2019

Related U.S. Application Data

(63) Continuation of application No. 15/313,950, filed as application No. PCT/KR2015/005294 on May 27, 2015, now Pat. No. 10,212,703.

(Continued)

(51) Int. Cl.
*H04L 29/08* (2006.01)
*H04W 84/18* (2009.01)
(Continued)

(52) U.S. Cl.
CPC ...... *H04W 72/0446* (2013.01); *H04B 1/7136* (2013.01); *H04L 1/1887* (2013.01);
(Continued)

(58) Field of Classification Search
CPC ... H04W 72/0446; H04W 4/70; H04W 76/14; H04W 4/005; H04W 8/005; H04W 72/02;
(Continued)

(56) References Cited

U.S. PATENT DOCUMENTS 9,826,539 B2    11/2017  Chatterjee et al.
9,847,848 B2    12/2017  Ryu et al.
(Continued)

FOREIGN PATENT DOCUMENTS

CN    102334368    1/2012
CN    103379642    10/2013
(Continued)

OTHER PUBLICATIONS

European Patent Office Application Serial No. 15799543.2, Search Report dated Oct. 12, 2017, 6 pages.
(Continued)

*Primary Examiner* — Melvin C Marcelo
(74) *Attorney, Agent, or Firm* — Lee, Hong, Degerman, Kang & Waimey

(57) ABSTRACT

According to an embodiment of the present invention, a discovery signal transmission method, by a device to device (D2D) terminal in a wireless communication system, comprises the steps of: determining a subframe pool in a discovery period; and transmitting a discovery signal in a subframe comprised in the subframe pool; wherein a frequency resource index and a time resource index, on which a discovery signal is transmitted in another discovery period which follows the discovery period, are determined by means of next_nf=(f_shift+floor((nf+Nf*nt)/Nt)) mod Nf and next_nt=(t_shift+nf+Nf*nt) mod Nt, respectively, wherein Nf is the number of discovery resources per subframe, Nt is the number of subframes per discovery period, f_shift is a frequency shift, t_shift is a subframe shift, nf is
(Continued)

a frequency resource index on which the discovery signal is transmitted, nt is a time resource index on which the discovery signal is transmitted, and the f_shift and the t_shift are determined on the basis of the value that is indicated by means of an upper layer parameter.

12 Claims, 9 Drawing Sheets

Related U.S. Application Data

(60) Provisional application No. 62/074,629, filed on Nov. 3, 2014, provisional application No. 62/055,644, filed on Sep. 25, 2014, provisional application No. 62/043,419, filed on Aug. 29, 2014, provisional application No. 62/040,428, filed on Aug. 22, 2014, provisional application No. 62/035,421, filed on Aug. 9, 2014, provisional application No. 62/034,760, filed on Aug. 7, 2014, provisional application No. 62/004,878, filed on May 29, 2014, provisional application No. 62/003,518, filed on May 27, 2014.

(51) Int. Cl.
| | | |
|---|---|---|
| *H04W 72/04* | (2009.01) | |
| *H04W 84/12* | (2009.01) | |
| *H04W 72/02* | (2009.01) | |
| *H04W 48/16* | (2009.01) | |
| *H04L 5/00* | (2006.01) | |
| *H04W 4/70* | (2018.01) | |
| *H04W 76/14* | (2018.01) | |
| *H04W 92/18* | (2009.01) | |
| *H04W 8/00* | (2009.01) | |
| *H04B 1/7136* | (2011.01) | |
| *H04L 1/18* | (2006.01) | |
| *H04L 1/00* | (2006.01) | |
| *H04W 88/02* | (2009.01) | |
| *H04W 84/04* | (2009.01) | |

(52) U.S. Cl.
CPC .......... *H04L 5/0012* (2013.01); *H04L 5/0094* (2013.01); *H04L 29/08477* (2013.01); *H04W 4/70* (2018.02); *H04W 8/005* (2013.01); *H04W 48/16* (2013.01); *H04W 72/02* (2013.01); *H04W 72/04* (2013.01); *H04W 76/14* (2018.02); *H04W 84/12* (2013.01); *H04W 84/18* (2013.01); *H04W 92/18* (2013.01); *H04L 2001/0097* (2013.01); *H04W 84/042* (2013.01); *H04W 88/02* (2013.01)

(58) Field of Classification Search
CPC ... H04W 72/04; H04W 76/023; H04W 84/12; H04W 84/18; H04W 92/18; H04W 84/042; H04W 88/02; H04L 29/08477; H04L 5/0012; H04L 5/0094; H04L 2001/0097; H04B 1/7136
See application file for complete search history.

(56) References Cited

U.S. PATENT DOCUMENTS

| | | |
|---|---|---|
| 2013/0094563 A1 | 4/2013 | Bae |
| 2013/0295976 A1 | 11/2013 | Patil et al. |
| 2014/0126417 A1 | 5/2014 | Kang et al. |
| 2015/0264551 A1 | 9/2015 | Ko et al. |
| 2015/0327315 A1 | 11/2015 | Xue et al. |
| 2017/0195163 A1 | 7/2017 | Chae et al. |
| 2017/0295603 A1 | 10/2017 | Chae |

FOREIGN PATENT DOCUMENTS

| | | |
|---|---|---|
| CN | 103380582 | 10/2013 |
| CN | 103442442 | 12/2013 |
| CN | 103457712 | 12/2013 |
| JP | 2010537501 | 12/2010 |
| WO | 2013025040 | 2/2013 |
| WO | 2013025057 | 2/2013 |
| WO | 2013107277 | 7/2013 |
| WO | 2014010956 | 1/2014 |
| WO | 2014034286 | 3/2014 |
| WO | 2015064442 | 5/2015 |

OTHER PUBLICATIONS

European Patent Office Application Serial No. 15798692.8, Search Report dated Oct. 16, 2017, 8 pages.
Asustek, "Discussion on the essentiality of frequency diversity for Type 2B discovery pattern evaluation", 3GPP TSG RAN WG1 Meeting #78, R1-143399, XP050788869, Aug. 2014, 7 pages.
Nokia, "Frequency hopping for discovery signal repetition", 3GPP TSG RAN WG1 Meeting #79, R1-144985, XP050876031, Nov. 2014, 5 pages.
United States Patent and Trademark Office U.S. Appl. No. 15/313,950, Notice of Allowance dated Jun. 21, 2018, 22 pages.
PCT International Application No. PCT/KR2015/005294, Written Opinion of the International Searching Authority dated Sep. 10, 2015, 16 pages.
PCT International Application No. PCT/KR2015/005236, Written Opinion of the International Searching Authority dated Sep. 18, 2015, 17 pages.
Intel Corporation, "Discussion on Type 2 D2D Discovery Procedure", R1-142033, 3GPP TSG RAN WG1 Meeting #77, May 10, 2014, 5 pages.
LG Electronics, "Discussionon Signaling for D2D Communication Resource Allocation", R1-142147, 3GPP TSG RAN WG1 Meeting #77, May 10, 2014, 8 pages.
Samsung, "Resource allocation for type 2B discovery", R1-141308, 3GPP TSG RAN WG1 Meeting #76bis, Mar. 22, 2014, 4 pages.
Asustek, "Resource Hopping Mechanism for Type 2B Discovery", R1-142360, 3GPP TSG RAN WG1 Meeting #77, May 10, 2014, 6 pages.
Huawei et al., "D2D discovery signal design", R1-141921, 3GPP TSG RAN WG1 Meeting #77, May 10, 2014, 3 pages.
Alcatel-Lucent et al., "Design of Scheduling Assignment", R1-142050, 3GPP TSG RAN WG1 Meeting #77, May 10, 2014, 3 pages.
United States Patent and Trademark Office U.S. Appl. No. 15/313,947, Office Action dated Jun. 5, 2018, 22 pages.
State Intellectual Property Office of the People's Republic of China Application Serial No. 201580027653.1, Office Action dated Dec. 4, 2017, 15 pages.
NTT DOCOMO, "On Resource Allocation and Timing of Type 2B Discovery", 3GPP TSG RAN WG1 Meeting #78, R1-143229, Aug. 2014, 9 pages.
NTT DOCOMO, "Discussion on Inter-cell Type 2B Discovery", 3GPP TSG RAN WG1 Meeting #77, R1-142268, May 2014, 5 pages.
Qualcomm, "WF on Type 1 and 2B Discovery Repetition", 3GPP TSG RAN WG1 Meeting #78, R1-143414, Aug. 2014, 4 pages.
Intel, "Remaining details of D2D discovery resource allocation", 3GPP TSG RAN WG1 Meeting #78bis, R1-143766, Oct. 2014, 9 pages.
LG Electronics, "Discussion on resource allocation for Type 2B discovery", 3GPP TSG RAN WG1 Meeting #78, R1-143402, Aug. 2014, 8 pages.
State Intellectual Property Office of the People's Republic of China Application Serial No. 201580027599.0, Office Action dated Mar. 15, 2019, 9 pages.

DATA TRANSMISSION METHOD AND APPARATUS BY DEVICE TO DEVICE TERMINAL IN WIRELESS COMMUNICATION SYSTEM

CROSS-REFERENCE TO RELATED APPLICATIONS

This application is a continuation of U.S. patent application Ser. No. 15/313,950, filed on Nov. 23, 2016, now U.S. Pat. No. 10,212,703, which is the National Stage filing under 35 U.S.C. 371 of International Application No. PCT/KR2015/005294, filed on May 27, 2015, which claims the benefit of U.S. Provisional Application Nos. 62/074,629 filed Nov. 3, 2014, 62/055,644 filed Sep. 25, 2014, 62/043,419 filed Aug. 29, 2014, 62/040,428 filed Aug. 22, 2014, 62/035,421 filed Aug. 9, 2014, 62/034,760 filed Aug. 7, 2014, 62/004,878 filed May 29, 2014 and 62/003,518 filed May 27, 2014, the contents of which are all hereby incorporated by reference herein in their entirety.

TECHNICAL FIELD

The following description relates to a wireless communication system and, more particularly, to a data transmission method and apparatus for Device-to-Device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that with the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention is to provide a method of performing hopping in discovery signal transmission based on a time resource pattern.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method of transmitting a discovery signal by a Device-to-Device (D2D) User Equipment (UE) in a wireless communication system, including determining a subframe pool in a discovery period, and transmitting the discovery signal in a subframe included in the subframe pool, wherein a frequency resource index and a time resource index on which the discovery signal is transmitted in a next discovery period of the discovery period are respectively determined by next_nf=(f_shift+floor((nf+Nf*nt)/Nt)) mod Nf and next_nt=(t_shift+nf+Nf*nt) mod Nt where Nf is the number of discovery resources per subframe, Nt is the number of subframes per discovery period, f_shift is a frequency shift, t_shift is a subframe shift, nf is a frequency resource index on which the discovery signal is transmitted, and nt is a time resource index on which the discovery signal is transmitted, and f_shift and t_shift are determined from values indicated by a higher-layer parameter.

In an aspect of the present invention, provided herein is a User Equipment (UE) for transmitting a Device-to-Device (D2D) signal in a wireless communication system, including a transmission module and a processor, wherein the processor is configured to determine a subframe pool in a discovery period and to transmit the discovery signal in a subframe included in the subframe pool, a frequency resource index and a time resource index on which the discovery signal is transmitted in a next discovery period of the discovery period are respectively determined by next_nf=(f_shift+floor((nf+Nf*nt)/Nt)) mod Nf and next_nt=(t_shift+nf+Nf*nt) mod Nt where Nf is the number of discovery resources per subframe, Nt is the number of subframes per discovery period, f_shift is a frequency shift, t_shift is a subframe shift, nf is a frequency resource index on which the discovery signal is transmitted, and nt is a time resource index on which the discovery signal is transmitted, and f_shift and t_shift are determined from values indicated by a higher-layer parameter.

f_shift may be changed in every discovery period.

The time resource index may be a subframe index of the subframe pool.

The frequency resource index may be a frequency resource index included in a resource block pool.

A frequency resource corresponding to one frequency resource index may be two resource blocks.

The time resource index and the frequency resource index may be virtual indexes.

Permutation may be performed on the virtual indexes prior to being mapped to a physical resource.

The permutation may be performed on at least one of a virtual index regarding a time resource and a virtual index regarding a frequency resource.

The permutation may be cell-specific permutation.

The subframe pool may be determined by a length-N bitmap.

The length-N bitmap may be generated by repeating a length-Nb bitmap.

Nb may be a multiple of N.

Advantageous Effects

According to embodiments of the present invention, interference/collision between D2D UEs transmitting discovery signals can be minimized.

The effects that can be achieved through the present invention are not limited to what has been particularly described hereinabove and other effects not described herein will be more clearly understood by persons skilled in the art from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
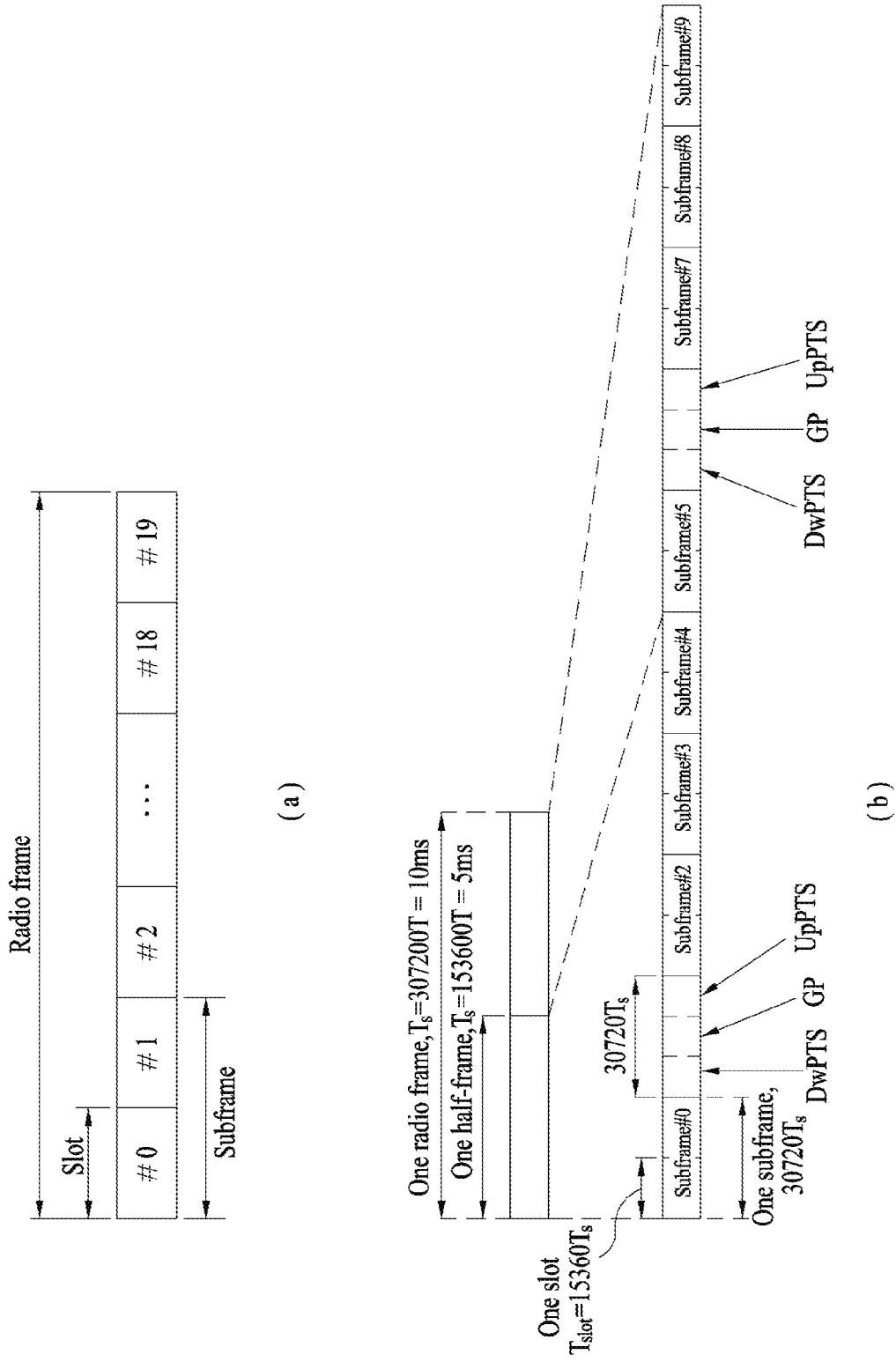
FIG. 1 is a diagram illustrating a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)". In the following embodiments, the term "base station" may mean an apparatus such as a scheduling node or a cluster header. If the base station or the relay transmits a signal transmitted by a terminal, the base station or the relay may be regarded as a terminal.

The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point. It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
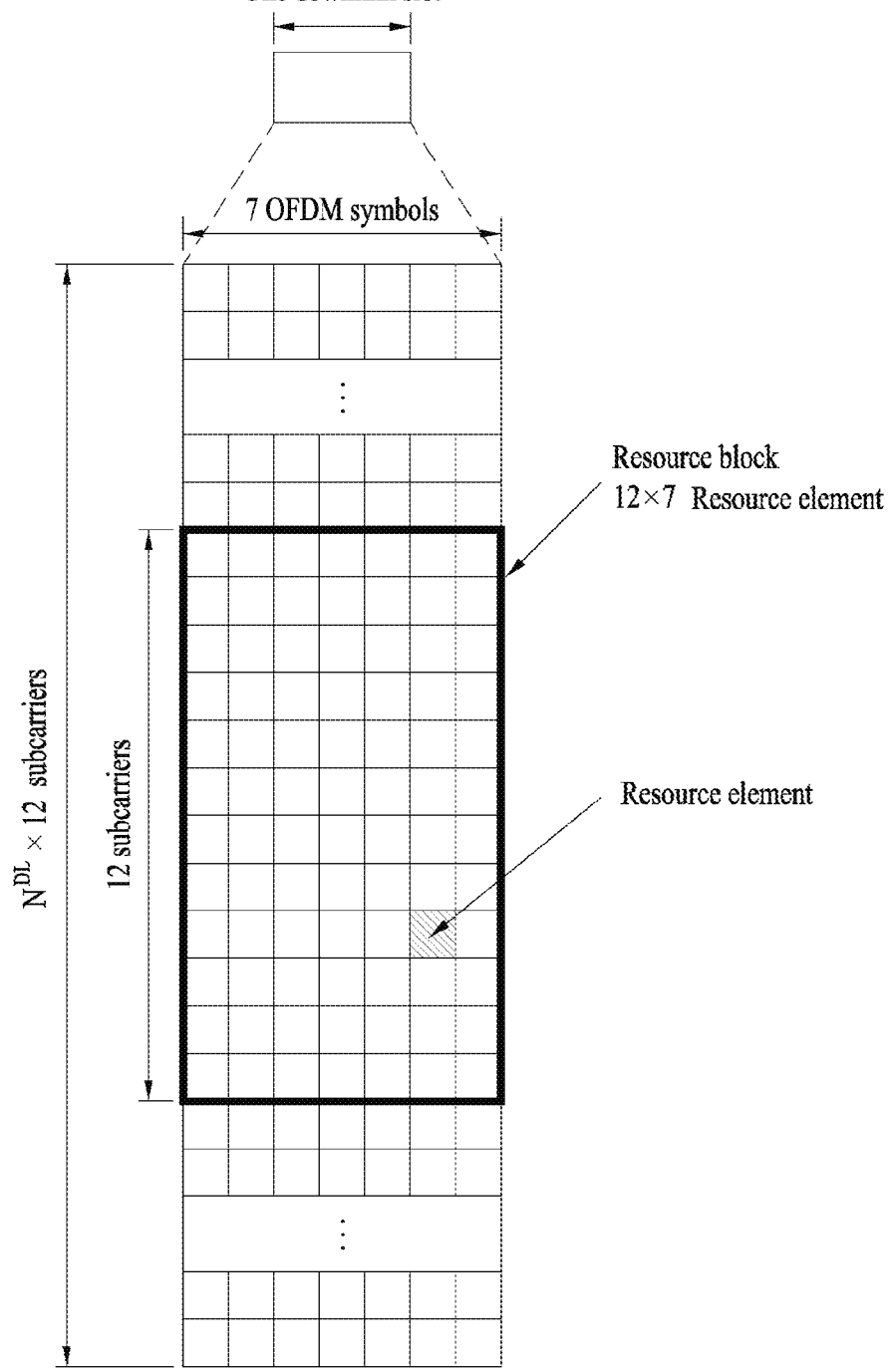
FIG. 2 is a diagram illustrating a resource grid for one DL slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12 7 REs. The number NDL of RBs included in a downlink slot depends on a DL transmission bandwidth. A UL slot may have the same structure as a DL slot.

Figure 3:
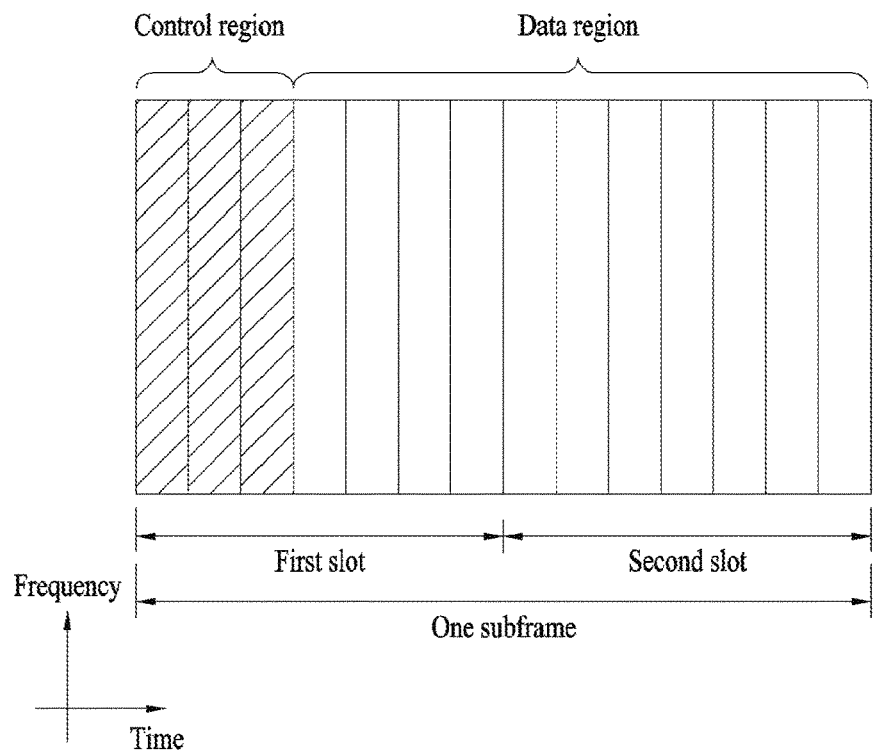
FIG. 3 is a diagram illustrating a DL subframe structure.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
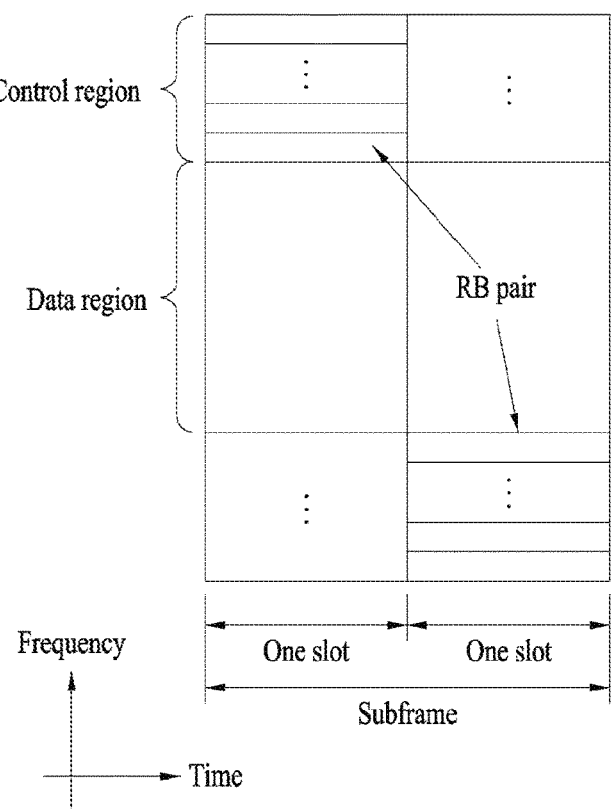
FIG. 4 is a diagram illustrating a UL subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS), and the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 5:
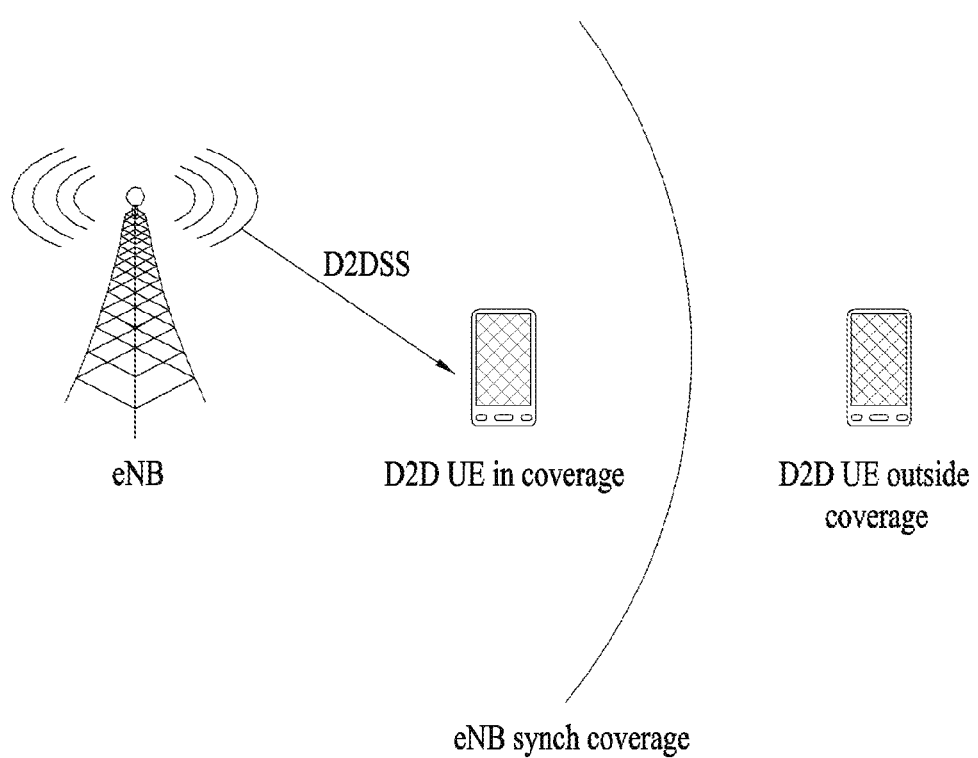
FIG. 5 is a diagram illustrating relay of a synchronization signal.

In a situation illustrated in FIG. 5, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE. FIG. 5 illustrates an exemplary case in which a D2DSS is relayed and communication is conducted between D2D UEs based on the relayed D2DSS.

A Time Resource Pattern (TRP) for use in transmitting data, a discovery signal, etc. by a UE will be described according to various embodiments of the present invention. The term 'TRP' may be interchangeably used with 'Resource Pattern for Transmission (RPT)' or 'Time-RPT (T-RPT)'. However, the terms should not be construed as limiting the scope of the present invention. Thus, it is clarified that a resource pattern having TRP properties as described below corresponds to a TRP. In the following description, a scheme for indicating the position of transmission resources by an eNB/UE is referred to as mode 1/type 2 and a scheme for indicating the position of transmission resources in a specific resource pool by a transmitting UE (by the UE's selection) is referred to as mode 2/type 1. In the following description, Scheduling Assignment (SA) may mean control information related to D2D data transmission and a channel carrying the control information. Before data transmission, an SA may first be transmitted. A receiving D2D UE may determine the position of resources carrying the data by decoding the SA and then receive a D2D signal in the resources. In the following description, D2D may be referred to as sidelink. For the convenience of description, the term 'TRP indication bit sequence' may be used. The TRP indication bit sequence may include only an ID included in an SA. If the SA includes an additional bit field indicating a TRP, the TRP indication bit sequence may be interpreted as ID+TRP bit sequence. Or a bit sequence for indicating a TRP independent of the ID may be included in the SA. In this case, the TRP bit sequence may be interpreted as the TRP indication bit sequence. A set of bit sequences used to indicate a TRP, included and transmitted in the SA may be interpreted as the TRP indication bit sequence.

TRP

Figure 6:
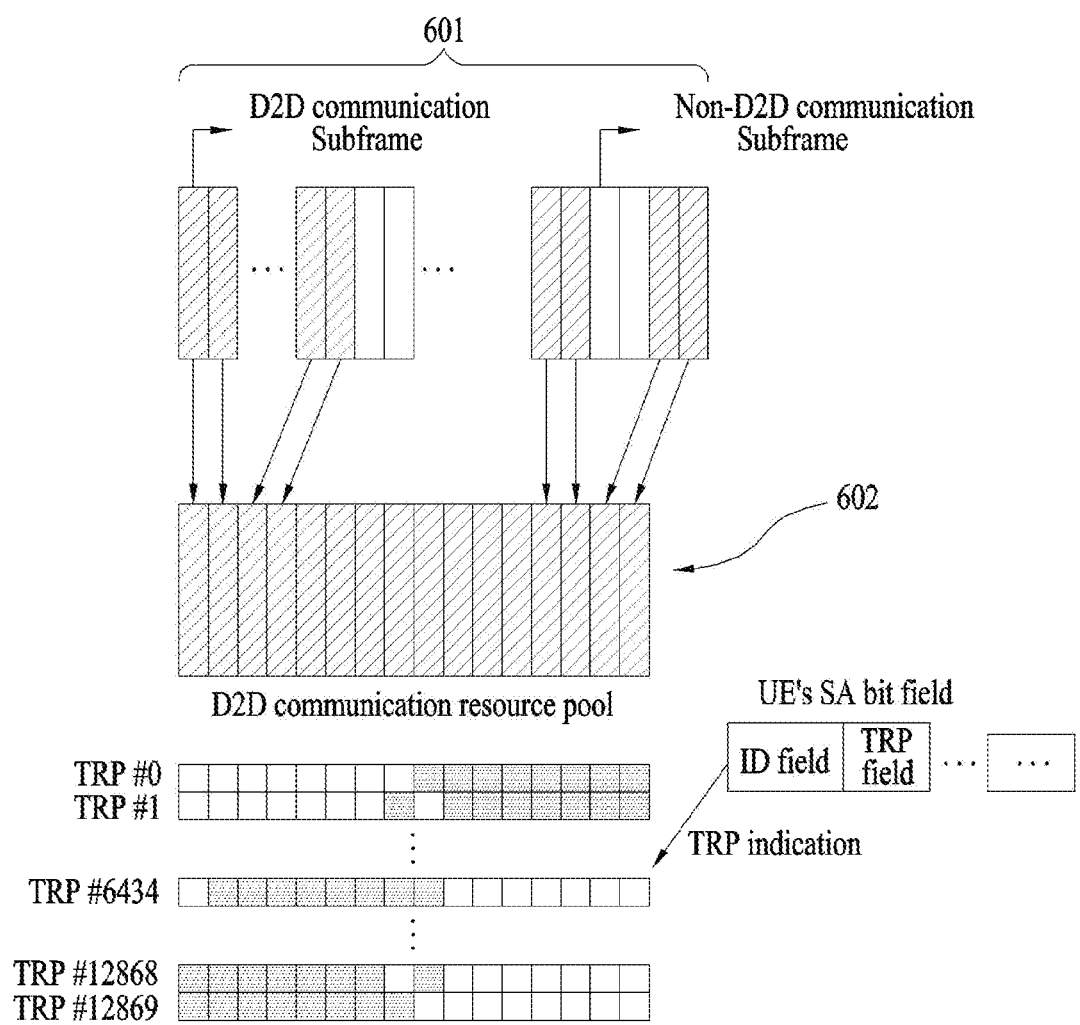
FIG. 6 is a diagram illustrating a time resource pattern according to an embodiment of the present invention.

FIG. 6 illustrates TRPs according to an embodiment of the present invention. Referring to FIG. 6, a plurality of subframes 601 may include subframes available for D2D signal transmission and reception (e.g., UL subframes in TDD, and D2D communication subframes in FIG. 6) and subframes unavailable for D2D signal transmission and reception (non-D2D communication subframes in FIG. 6). The plurality of subframes 601 may be included within a D2D control information transmission period (e.g., a physical sidelink control channel). A subframe pool 602 for data transmission may be determined, which includes only D2D communication subframes from among the plurality of subframes 601.

As TRPs (TRP #0, #1, . . . ) are applied to the subframe pool 602 for data transmission, a set of subframes to transmit D2D data may be determined. For example, if TRP #1 is applied to the subframe pool 602 for data transmission, an 8th subframe and 10th to 16th subframes may be included in a subframe set, for D2D data transmission. Shaded parts of the TRPs in FIG. 16 may indicate subframes that will carry D2D data. A TRP may be a bitmap having bits corresponding to the respective subframes of a subframe pool for data transmission. If a bit of the bitmap is set to 1, the bit may indicate a subframe to transmit D2D data. Specifically, if a TRP is configured to be a bitmap, the shaded parts of the TRP may be is and the non-shaded parts of the TRP may be 0s in FIG. 6. For example, TRP #1 is a bitmap of {0, 0, 0, 0, 0, 0, 0, 1, 0, 1, 1, 1, 1, 1, 1, 1}.

Once a subframe set is determined for transmission of D2D data, the D2D data may be transmitted in the subframe set. Upon receipt of an SA, a UE may detect and decode a D2D signal in corresponding subframes, expecting transmission of the D2D signal in the subframes.

In the above description, a Transport Block (TB) for D2D data may be transmitted in a predetermined number of subframes in a subframe set. That is, the number of repetitions/a retransmission number/the number of retransmissions may be predetermined for each TB. For example, the number of retransmissions per TB may be fixed to 4.

The above-described plurality of subframes may be contiguous subframes following D2D control information-related subframes (including UL subframes that may carry D2D control information, DL subframes with no relation to the UL subframes, and special subframes in TDD) in one D2D control information period (i.e., one SA period). The D2D control information (an SA, an MCS, resource allocation information, a TRP, etc.) may be transmitted in subframes determined to transmit D2D control information (i.e., a subframe pool (for D2D control information)) from among subframes available for transmission of D2D control information according to an SA subframe bitmap. In this case, information indicating a TRP in a subframe next to the subframe pool for D2D control information may be transmitted in the D2D control information. If one SA period is configured as described above, subframes included in a subframe pool for data transmission are not overlapped with subframes included in a subframe pool for D2D control information. More specifically, if the subframe pool for D2D control information is overlapped with the subframe pool for D2D data transmission, it may be regulated that D2D control information or D2D data is always transmitted and the D2D control information and the D2D data are not transmitted in the same subframe.

Meanwhile, the subframe pool for data transmission may not be defined separately in D2D communication mode 1. In this case, UL subframes following the subframe pool for D2D control information transmission (specifically, a subframe pool including the first subframe of a subframe bitmap for D2D control information transmission to a subframe corresponding to the last 1 of the bitmap) may be a subframe pool for implicit mode 1 D2D data transmission.

Application of TRP

In the foregoing description, a TRP may be applied to subframes as follows.

A UE may determine a subframe indicator bitmap corresponding to TRP indication information. If the UE is a D2D control information transmitter, the TRP indication information may be transmitted in D2D control information. If the UE is a D2D control information receiver, the TRP indication information may be included in received D2D control information. Herein, the TRP indication information may be described in a later-described TRP indication part or may be an index indicating a specific subframe indicator bitmap. For example, if the size of the subframe indicator bitmap is 8, there may be a set of available bitmaps. An index may be assigned to each bitmap included in the bitmap set and a subframe indicator bitmap may be determined by such as index.

A bitmap to be applied to a subframe pool for data transmission may be determined from the subframe indicator bitmap. The subframe indicator bitmap may be smaller than the subframe pool for data transmission in size. In this case, the subframe indicator bitmap (e.g., a TRP indication bit sequence) may be repeated. If the length of the TRP indication bit sequence is M, the M-bit sequence is simply repeated and filled in the remaining L subframes. If L is not a multiple of M, a TRP may be generated by sequentially filling the remaining bit sequence in the L subframes.

That is, if the subframe indicator bitmap is smaller in size than the subframe pool for data transmission, the subframe indicator bitmap may be repeated within the bitmap for the subframe pool for data transmission.

For example, if the size M of the subframe indicator bitmap is smaller than the number of subframes in the resource pool for data transmission and the UE transmits D2D data in the first subframe of the subframe pool for data transmission, the UE may transmit D2D data in a (1+M)th subframe of the subframe pool. Or a first bit value of the bitmap (to be applied to the subframe pool for data transmission) may be equal to a (subframe indicator bitmap size+1)th bit value.

If the size of the subframe pool for data transmission is not a multiple of the size of the subframe indicator bitmap, the bits of the last repeated subframe indicator bitmap may be used sequentially. In other words, if the size of the subframe pool for data transmission is not a multiple of the size of the subframe indicator bitmap, the last repeated subframe indicator bitmap may be truncated. Specifically, if the subframe indicator bitmap is 16 bits {0, 0, 0, 0, 0, 0, 0, 1, 0, 1, 1, 1, 1, 1, 1, 1} and the subframe pool includes 36 subframes, the bitmap (to be applied to a subframe pool for data transmission) is configured by repeating the subframe indicator bitmap twice and using the first 4 bits of the subframe indicator bitmap sequentially at the third repetition (while truncating the remaining bits). That is, the bitmap (to be applied to the subframe pool for data transmission) is {0, 0, 0, 0, 0, 0, 0, 1, 0, 1, 1, 1, 1, 1, 1, 1, 0, 0, 0, 0, 0, 0, 0, 1, 0, 1, 1, 1, 1, 1, 1, 1, 0, 0, 0, 0}.

Indication of TRP

Now, a description will be given of a method for indicating the above-described TRP.

First, an eNB may indicate an ID and TRP bits included and transmitted in an SA by a D2D SA grant in mode 1. The ID sequence included in the SA and/or the sequence of a TRP bit field included in the SA (a bit field indicating a specific ID and/or a TRP) may be explicitly included in the D2D SA grant. Or the ID sequence to be transmitted in the SA and/or the TRP bit field to be transmitted in the SA may be generated by hashing the bit sequence of a D2D-RNTI or using partial bits (e.g., lower N bits) of the bit sequence of the D2D-RNTI. Because an RNTI is different for each UE and at least a part of the RNTI is used, the position of D2D resources may be configured for each UE without additional signaling. A D2D-RNTI is an ID pre-signaled to distinguish D2D control information from other control information and is used for masking the CRC of the D2D control information. A part of the ID included and transmitted in the SA may be generated from the RNTI and the remaining part of the ID may be generated based on a target ID (or a group ID). Or the ID may be generated by combining (e.g., AND/XOR/OR-operating) both the RNTI and the target or group ID. The ID included and transmitted in the SA may be changed over time. Characteristically, only a Transmission (Tx) UE ID may be changed. This is because if up to a target UE ID part is hopped and a target UE is not aware of the hopping, the target UE may not detect the ID. If the target UE is aware of even a hopping pattern of the target UE ID part, every ID sequence included in the SA may be hopped in a predetermined rule. The changeability (hopping) of the ID sequence over time may be implemented by directly setting a different bit field in a D2D SA grant by the eNB and the ID sequence may be changed in a predetermined rule after the D2D SA grant of the eNB. For example, the ID sequence included in the D2D SA grant may be used as an initialization parameter for a random sequence and a time-variant sequence may be generated using a random sequence created using the initialization parameter.

Second, an ID may be transmitted in an SA and a TRP may be determined using the ID in mode 2. The ID may be a short ID induced from an ID (a transmission and/or reception (target or group) ID) by a higher layer or a bit sequence used to configure the transmission position of data and a scrambling parameter. If the ID included in the SA is too short for creation of TRP candidates, the probability of collision between IDs is increased. In this case, a plurality of Tx UEs are likely to use the same TRP. To prevent this, a part of the bits of the SA may include bits indicating a TRP. Also, a specific TRP may be indicated by combining an ID bit field and bits of a TRP field in the SA. For example, the ID included in the SA may be used to indicate a TRP set and TRP indication bits included in the SA may indicate a specific index within the TRP set. In another example, the TRP bits included in the SA may indicate a specific TRP set within a resource pool and the ID included in the SA may indicate a specific TRP within the pool/set indicated by the TRP bits. In this case, the bits indicating a TRP set may be transmitted semi-statically without being transmitted in every SA. For example, the bits indicating a TRP set may be used as a virtual CRC on the assumption that the bits are transmitted in every nth SA or even though the bits are transmitted in every SA, they are not changed over n SA transmissions. Meanwhile, these TRP bits are not included additionally. Rather, the TRP bits may be transmitted by borrowing an unused state of MCS bits or any other SA bit field. Or a TRP pattern may be indicated by using all unused states of additionally included bits and other bit fields.

Meanwhile, the size of TRP bits used in an indication of an SA may be changed according to the size of a D2D UE group or the number of Tx UEs in the group. For example, if a specific police officer group includes N police officers, the number of TRP indication bits is set to log 2(N). Herein, the remaining unused bits may be used for other purposes or may be set to Os for use as a virtual CRC.

Meanwhile, an ID may be set differently for a TRP in mode 1 and mode 2. For example, while a TRP may be indicated using only a Tx UE ID in mode 1, a TRP may be indicated using both a Tx UE ID and a target UE ID (group ID) in mode 2.

To configure a TRP, the following information may be used: i) information about the size of a transmission opportunity from the viewpoint of a UE (this information indicates how many resources are allocated to one UE by one SA); and ii) information about the number of retransmissions for each TB (this information may be information about the number of TBs transmitted during one SA period. In this case, the number of retransmissions for each TB may be calculated by flooring the size (number) of transmission opportunities during one SA period/the number of TBs transmitted by one SA. Or this information may be information about the (maximum) number of repetitions for each TB). Part of the information may be preset or configured by the network. The information may be preset for an out-of-coverage UE or signaled to the out-of-coverage UE from another UE within the network by a physical-layer signal or a higher-layer signal. In addition, part of the information may be included and transmitted in an SA. For example, the transmission opportunity size may be preset or configured by the network. Herein, a retransmission number for each TB may be included and transmitted in the SA. On the other hand, information about the transmission opportunity size may be included and transmitted in the SA and information about the retransmission number may be preset or semi-statically indicated in a higher-layer signal by the network.

In a specific example, if an SA includes an 8-bit ID, the number of TRPs distinguishable by IDs is 256 (=2^8). If a mode-2 resource pool includes 16 subframes and a transmission opportunity size is 8, the number of TRPs that can be generated is 12870 (=16C8). Therefore, it is impossible to identify a TRP only by the ID bits included in the SA. To avoid this problem, additional bits may be included in the SA in order to indicate a TRP in the above-described method. In this case, about 6 additional bits are needed to distinguish all TRPs that can be produced. The additional bits may be available from a combination of unused MCS states and a new bit field or from an additional bit field.

Signaling of TRP Subset

A network may signal TRP subset configuration through a higher-layer signal (e.g. Radio Resource Control (RRC) signal). More specifically, as described above, a UE may determine a bitmap which is to be applied to a subframe pool for data transmission using information indicating a TRP and transmit D2D data in a subframe indicated by the bitmap. In this case, if an RRC information element relating to a TRP subset is configured for the UE, a set of bitmaps that can be indicated by the information indicating the TRP may be a subset of the set of the bitmaps that can be indicated by the information indicating the TRP in the case in which the UE is irrelevant to the RRC information element relating to the TRP subset. The information indicating the TRP is an index indicating any one bitmap out of the set of the bitmaps.

The above description will now be given in more detail with reference to Table 1 shown below. Table 1 defines the relationship between information $I_{TRP}$ indicating a TRP and a bitmap corresponding to the information indicating the TRP when the size of a subframe indication bitmap relating to the TRP is 6. For example, if the information $I_{TRP}$ indicating the TRP is 22, the subframe indication bitmap is $\{0, 1, 1, 0, 1, 0\}$.

TABLE 1

| $I_{TRP}$ | $k_{TRP}$ | $(b_0', b_1', \ldots b_{N_{TRP}-1}')$ |
|---|---|---|
| 0 | reserved | reserved |
| 1 | 1 | (1,0,0,0,0,0) |
| 2 | 1 | (0,1,0,0,0,0) |
| 3 | 2 | (1,1,0,0,0,0) |
| 4 | 1 | (0,0,1,0,0,0) |
| 5 | 2 | (1,0,1,0,0,0) |
| 6 | 2 | (0,1,1,0,0,0) |
| 7 | 3 | (1,1,1,0,0,0) |
| 8 | 1 | (0,0,0,1,0,0) |
| 9 | 2 | (1,0,0,1,0,0) |
| 10 | 2 | (0,1,0,1,0,0) |
| 11 | 3 | (1,1,0,1,0,0) |
| 12 | 2 | (0,0,1,1,0,0) |
| 13 | 3 | (1,0,1,1,0,0) |
| 14 | 3 | (0,1,1,1,0,0) |
| 15 | 4 | (1,1,1,1,0,0) |
| 16 | 1 | (0,0,0,0,1,0) |
| 17 | 2 | (1,0,0,0,1,0) |
| 18 | 2 | (0,1,0,0,1,0) |
| 19 | 3 | (1,1,0,0,1,0) |
| 20 | 2 | (0,0,1,0,1,0) |
| 21 | 3 | (1,0,1,0,1,0) |
| 22 | 3 | (0,1,1,0,1,0) |
| 23 | 4 | (1,1,1,0,1,0) |
| 24 | 2 | (0,0,0,1,1,0) |
| 25 | 3 | (1,0,0,1,1,0) |
| 26 | 3 | (0,1,0,1,1,0) |
| 27 | 4 | (1,1,0,1,1,0) |
| 28 | 3 | (0,0,1,1,1,0) |
| 29 | 4 | (1,0,1,1,1,0) |
| 30 | 4 | (0,1,1,1,1,0) |
| 31 | 5 | (1,1,1,1,1,0) |
| 32 | 1 | (0,0,0,0,0,1) |
| 33 | 2 | (1,0,0,0,0,1) |
| 34 | 2 | (0,1,0,0,0,1) |
| 35 | 3 | (1,1,0,0,0,1) |
| 36 | 2 | (0,0,1,0,0,1) |
| 37 | 3 | (1,0,1,0,0,1) |
| 38 | 3 | (0,1,1,0,0,1) |
| 39 | 4 | (1,1,1,0,0,1) |

TABLE 1-continued

| $I_{TRP}$ | $k_{TRP}$ | $(b_0', b_1', \ldots b_{N_{TRP}-1}')$ |
|---|---|---|
| 40 | 2 | (0,0,0,1,0,1) |
| 41 | 3 | (1,0,0,1,0,1) |
| 42 | 3 | (0,1,0,1,0,1) |
| 43 | 4 | (1,1,0,1,0,1) |
| 44 | 3 | (0,0,1,1,0,1) |
| 45 | 4 | (1,0,1,1,0,1) |
| 46 | 4 | (0,1,1,1,0,1) |
| 47 | 5 | (1,1,1,1,0,1) |
| 48 | 2 | (0,0,0,0,1,1) |
| 49 | 3 | (1,0,0,0,1,1) |
| 50 | 3 | (0,1,0,0,1,1) |
| 51 | 4 | (1,1,0,0,1,1) |
| 52 | 3 | (0,0,1,0,1,1) |
| 53 | 4 | (1,0,1,0,1,1) |
| 54 | 4 | (0,1,1,0,1,1) |
| 55 | 5 | (1,1,1,0,1,1) |
| 56 | 3 | (0,0,0,1,1,1) |
| 57 | 4 | (1,0,0,1,1,1) |
| 58 | 4 | (0,1,0,1,1,1) |
| 59 | 5 | (1,1,0,1,1,1) |
| 60 | 4 | (0,0,1,1,1,1) |
| 61 | 5 | (1,0,1,1,1,1) |
| 62 | 5 | (0,1,1,1,1,1) |
| 63 | 6 | (1,1,1,1,1,1) |
| 64-127 | reserved | reserved |

Table 1 shown above may be referred to as a mother bitmap set capable of being used when there is no additional RRC signaling. In this case, the RRC information element relating to the TRP subset may be configured for the UE and may restrict a set usable as an index in Table 1. For example, when $k_{TRP}$ usable by the UE is up to 4, if the RRC information element relating to the TRP subset is {1, 1, 1, 0}, a set of bitmaps corresponding to $k_{TRP}$ of 1, 2, and 3 in Table 1 may be a subset of the mother bitmap set. That is, if an information element relating to an RRC-signaled TRP subset is configured, a set of bitmaps usable by the UE or a set of information indicating the TRP is a subset of a set of the bitmaps or a subset of a set of the information indicating the TRP when the UE is irrelevant to the RRC information element relating to the TRP subset (when the RRC information element is not signaled or when the RRC information element is signaled but is not configured).

The RRC information element relating to the TRP subset may be for the UE of transmission mode 2.

Restriction of the TRP subset by the network may be particularly effective when the UE determines transmission resources as in mode 2. When the UE randomly selects a TRP index from the TRP, if a small number of neighbor UEs is present so that there is less interference, $k_{TRP}$ of a large value is selected to rapidly transmit packet and, if a large number of neighbor UEs is present so that there is much interference, a subset is limited to $k_{TRP}$ of a relatively small value in order to solve problems of in-band emission and half duplex, thereby preventing a specific UE from continuously generating much interference.

Meanwhile, while restriction of the TRP subset may be implemented by restricting the value of $k_{TRP}$, it may also be implemented by restricting a specific TRP index. For example, signaling may be performed such that a specific UE or a specific UE group may use a specific $I_{TRP}$ set. Although this method requires more signaling bits than the case of restricting the subset by signaling the value of $k_{TRP}$, it is possible to flexibly restrict the TRP subset. In addition, this method may be used to enable a specific UE or UE group and another UE or UE group to use different subframes in the time domain. For instance, a TRP subset may be configured such that a UE group A transmits packets in all or a part of front four subframes in a TRP bitmap and a TRP subset may be configured such that a UE group B transmits packets in all or a part of back four subframes in the TRP bitmap.

Discovery Signal and TRP

The TRP generation scheme in association with the above-described TRP (including the description regarding TRP generation disclosed in paragraphs [86] to [245] of Korean Patent Application Number PCT/KR2015/004319) may be applied to a discovery signal transmitted under indication of an eNB. Type 1 discovery is a scheme in which an eNB or a specific scheduling node (if a UE has a scheduling function, the UE may be the scheduling node) configures a resource pool and a UE, which is to transmit the discovery signal, selects one or multiple resources from the configured resource pool to transmit the discovery signal. In type 2 discovery, an eNB or a specific scheduling node (a UE may be the scheduling node if the UE has a scheduling function) indicates a discovery signal transmission resource for a specific UE. In this case, the eNB or the specific scheduling node may individually indicate the discovery signal transmission resource during every discovery signal transmission or may indicate multiple discovery transmission resources through one indication. If the eNB or the scheduling node individually indicates the discovery signal transmission resource, this may be referred to as type 2a and, if the eNB or the scheduling node indicates multiple discovery signal transmission resources, this may be referred to as type 2B. In type 2 discovery, if the same eNB schedules different UEs, since the eNB may configure the discovery signal transmission resources in such a manner that the UEs use different resources, resource collision between the UEs does not occur. Meanwhile, in type 1, since a UE selects resources, resource collision may occur when different UEs select the same resource. In type 2B, the eNB desirably configures the discovery signal transmission resources such that the UEs transmit discovery signals at as different locations as possible. If UEs that transmit multiple discovery signals simultaneously perform transmission of the discovery signals, since the UEs cannot receive (hear) signals when transmitting the discovery signals, the UEs cannot discover each other. Such a problem may be referred to as a half duplex constraint. To solve the half duplex constraint, it is desirable that the eNB or the scheduling node cause the UEs to transmit the discovery signals at different timings.

If resource pools for type 2B are preconfigured and the eNB indicates a transmission timing in each pool, this has a problem similar to the case of signaling of a TRP in D2D communication.

Assuming that a resource pool for type 2B includes N subframes and each UE transmits discovery signals in M subframes during N subframes, the eNB (hereinafter, both the eNB and the scheduling node will be referred to as the eNB) may indicate a length-N TRP to each UE that transmits the discovery signals. In this case, an indication method may be one of the above proposed methods. In discovery, a discovery resource pool (period) may be periodically configured and the resource pool may be signaled through an SIB. The resource pool of type 2B may be included in the resource pool of type 1 or may be configured as an additional resource pool.

If a type 2 discovery resource includes T subframes and one UE transmits the discovery signal M times on the discovery resource, the eNB may indicate a weight-M and length-T TRP. In this way, a scheme in which the eNB indicates multiple discovery signal transmissions is referred to as type 2B discovery. In this case, the T subframes may be generated by gathering a plurality of discovery periods or may be configured within one discovery period. As one of the above proposed TRP generation methods, the eNB may signal a TRP index to a UE transmitting a type 2B discovery signal through a physical layer signal (or a higher-layer signal). In this case, the TRP index may be hopped at every period or column-permutated by a specific rule. In this case, a permutation rule may be linked to a specific ID or a combination of IDs among a physical cell ID, a virtual cell ID, a synchronization source ID, a D2D-RNTI, and a Tx UE ID. Upon generation of a TRP set, a scheme for generating the set may be linked to a specific ID or a combination of IDs among a physical cell ID, a virtual cell ID, a synchronization source ID, a D2D-RNTI, and a Tx UE ID. The eNB may signal a specific TRP set and a TRP in the TRP set, which are to be used. As mentioned above, since the TRP set may be linked to a specific ID (e.g., a cell ID), signaling for an ID or additional explicit signaling for specifying the TRP set may not be present. Alternatively, a specific ID may be signaled to directly indicate a specific TRP set.

Meanwhile, the above-mentioned cell-specific TRP generation scheme may be interpreted as indicating that a hopping pattern differs according to a cell. If a TRP is linked to a cell ID, this may mean that a hoppling pattern differs according to a cell. In description regarding TRP generation disclosed in paragraphs [86]-[245] of Korean Patent Application Number PCT/KR2015/004319, it may be appreciated that, based on a first transmission resource location in Method 8, the next resource location is determined and the eNB indicates the first resource location, so that the next hopping pattern is determined. Hereinafter, hopping will be described in more detail.

Discovery Signal Transmission and Hopping

As described earlier, a TRP may be used to determine a resource for transmitting a discovery signal. For example, in TDD, a predetermined number of UL subframes is selected from among UL subframes included in one discovery period and a bitmap is applied to the selected UL subframes, thereby determining a subframe pool. The subframe pool may be determined by a length-N bitmap and the length-N bitmap may be generated by repeating a length-Nb bitmap. In this case, Nb may be a multiple of N. In addition, a resource block pool may be determined. The resource block pool may be a set of PRBs used for discovery signal transmission. All discovery resources in one discovery period may be determined by the subframe pool and the resource block pool. One discovery resource may include one subframe and two RBs and may be indicated by a time resource index and a frequency resource index.

In this case, the discovery resource may be hopped at every discovery period.

As a first (type 2B) hopping method, a frequency resource index and a time resource index on which a discovery signal is transmitted at the next discovery period of the discovery period may be determined by Equation 1.

next_$nf$=($f$_shift+floor(($nf$+$Nf$*$nt$)/$Nt$))mod $Nf$ next_$nt$=($t$_shift+$nf$+$Nf$*$nt$)mod $Nt$ [Equation 1]

Here, Nf is the number of discovery resources per subframe, Nt is the number of subframes per discovery period, f_shift is a frequency shift, t_shift is a subframe shift, nf is a frequency resource index on which the discovery signal is transmitted, and nt is a time resource index on which the discovery signal is transmitted.

In addition, f_shift and t_shift may be values determined by a higher-layer parameter (may be signaled through a higher-layer signal). The time resource index may be a subframe index of the subframe pool. The frequency resource index may be a frequency resource index included in an RB pool and a frequency resource corresponding to one frequency resource index may be two RBs.

Figure 7:
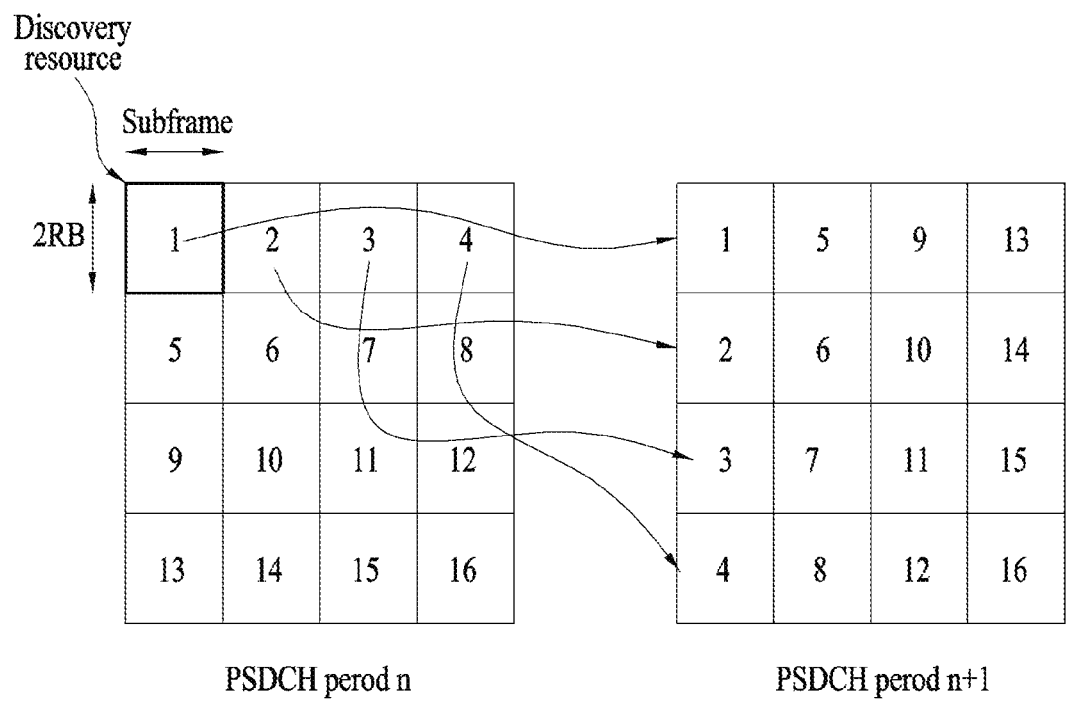
FIGS. 7 to 9 are diagrams illustrating a hopping method according to an embodiment of the present invention.

For hopping according to Equation 1, reference is made to FIG. 7. FIG. 7 illustrates hopping performed at discovery periods n and n+1. For convenience of description, it is assumed that Nf=4, Nt=4, t_shift=1, and f_shift=4. Under this assumption, 16 discovery resources in a discovery period n are hopped to 16 discovery resources in a discovery period n+1 according to Equation 1. That is, according to Equation 1, time indexes and frequency indexes are switched to thereby solve a half duplex problem.

As briefly described mentioned above, t_shift and/or f_shift may be determined by a cell ID or signaled through a higher-layer signal. In this case, t_shift and/or f_shift may vary with a cell ID and a period index. For example, t_shift and/or f_shift may be configured by a random sequence generator having the cell ID as a seed value and a random sequence may be set to a value varying with a discovery period. As another embodiment indicating that t_shift and/or f_shift varies with the discovery period, t_shift and/or f_shift may be set to value(s) which are increased at every period. In this case, initial value(s) of t_shift and/or f_shift may be determined by receiving a higher-layer signal of a network, and t_shift and/or f_shift may be set to value(s) increased at every period but a modulo operation may be introduced so as not to excessively increase the set value(s).

Upon determining a time-frequency resource on which a discovery signal is to be transmitted in a discovery period and transmitting a discovery signal on the time-frequency resource, if the discovery signal is repeated b times in the discovery period, the discovery signal is repeated on consecutive time resources and the frequency resource (on which the discovery signal is transmitted) may be hopped by floor(Nf/b). That is, when the discovery signal is repeated b times in the discovery period, if a current frequency location is nf, a frequency location of next transmission may be determined by Equation 2. The time resource may be a subframe which is consecutive from previous transmission.

($nf$+floor($Nf$/$b$))mod $Nf$ [Equation 2]

In other words, if the discovery signal is permitted to be transmitted a times in one period, consecutive transmissions may be applied in the time domain. In this case, transmissions in the frequency domain may be performed while hopping using mod(nf+floor(Nf/b), nf). In this case, b may be a predetermined value (e.g., 2, 4 or a specific value which is relatively prime with Nf and may be a value linked with the number of transmissions, a, in a period (e.g., b=a or b=floor(a/2)). In this case, the value b may be set to a common value regardless of a cell ID or may be set to a cell-specific value. If the discovery signal is permitted to be transmitted a times in one period, the method of performing consecutive transmissions in the time domain can advantageously reduce the size of a buffer because a reception UE only needs to store D2D signals of consecutive subframes in the buffer. Similarly to Equation 1, if a hopping method for solving the half duplex problem (the half duplex problem refers to a phenomenon in which a transmission UE cannot receive a signal transmitted in same subframe as a subframe in which the UE transmits a signal) in one period is used, first reception and next reception differ in subframes and thus a reception UE should implement a sufficiently large buffer. Hopping to which repeated transmissions of the discovery signal are applied may be used together with or independently of the first hopping method.

Similarly to Equation 2, hopping may be performed by dividing a frequency resource of a D2D resource by a repeated number of times, using Equation 3

$$nf(k)=[nf(0)+k*\text{floor}(Nf/M)]\text{modulo } Nf \quad \text{[Equation 3]}$$

In Equation 3, nf(k) denotes a frequency resource location of a k-th transmission in a period, nf(0) denotes a frequency resource location of first transmission in a period, Nf is the number of discovery resources in the frequency domain in a discovery period, and M is the number of transmissions (=number of repetitions+1) in a period.

Figure 8:
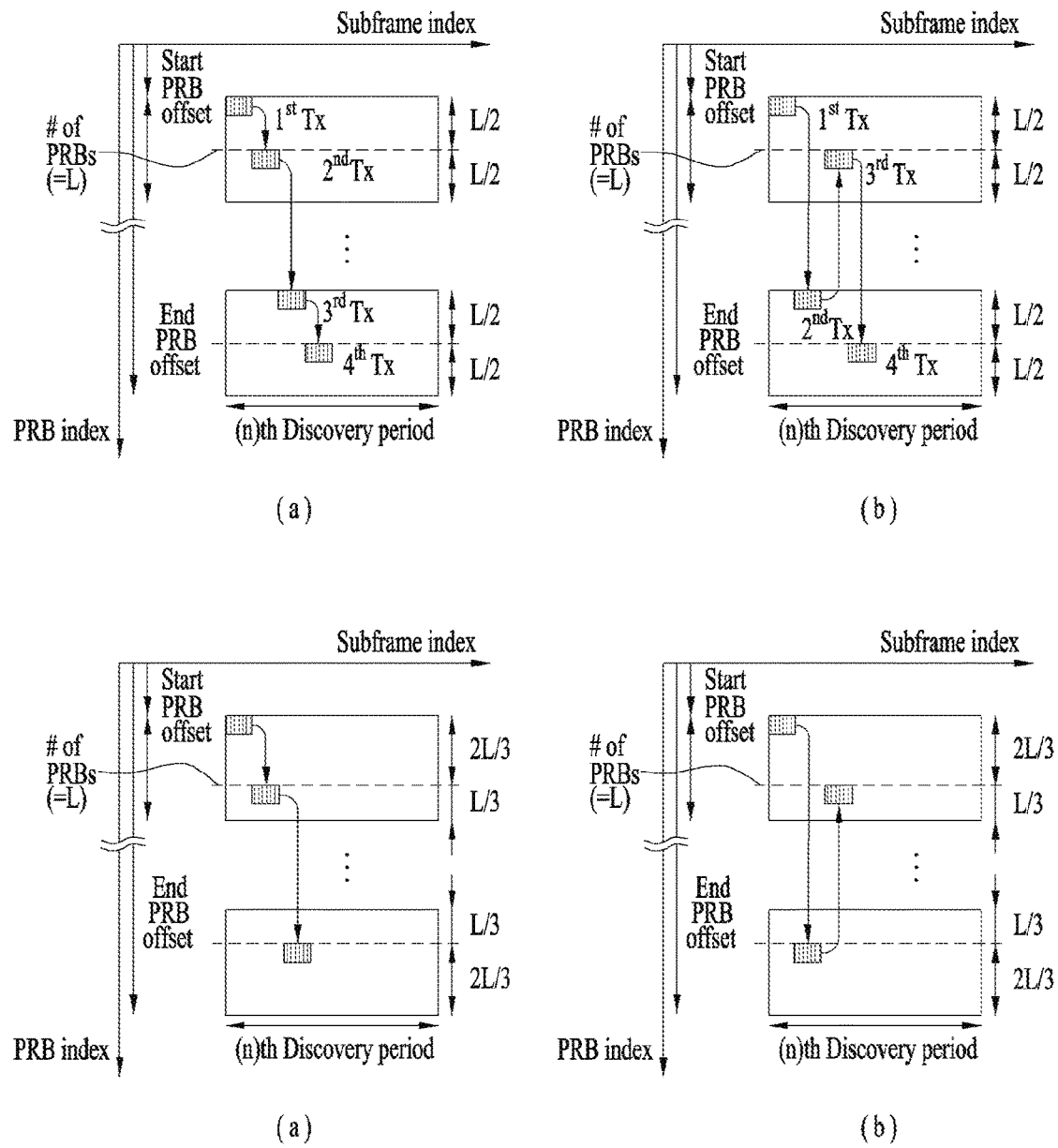

According to Equation 3, hopping may be performed as illustrated in FIGS. 8(a) and (c). That is, frequency hopping is performed a number of times obtained by dividing the number of discovery resources by the number of transmissions in a period and repeatedly transmitted resources may be evenly distributed in the entire frequency band. In FIG. 8(a), the number of transmissions is 4 (the number of repetitions is 3) and, in FIG. 8(c), the number of transmissions is 3 (the number of repetitions is 2). In FIG. 8, L is the length of a discovery PRB, S is a start PBR offset, and E is an end PRB offset.

According to Equation 3, a frequency hopping size between D2D signal transmissions may be configured by a network through physical layer or higher-layer signaling. That is, a value configured by the network rather than a value regarding the number of repetitions and a discovery frequency resource size is used as the hopping size. Accordingly, additional signaling by the network is needed. If the network can configure frequency hopping sizes between first and second transmissions, second and third transmissions, and third and fourth transmissions, greater flexibility may be obtained. However, this method increases network signaling.

As another method of performing hopping through division of the D2D frequency resource, Equation 4 may be used.

$$nf(k)=[nf(0)+\text{mod}(k,2)*\text{ceil}(M/2)*\text{floor}(Nf/M)+\text{floor}(k/2)*\text{floor}(Nf/M)]\text{modulo } Nf \quad \text{[Equation 4]}$$

According to Equation 4, hopping as illustrated in FIGS. 8 (b) and 8(d) may be performed. More specifically, in FIG. 8(b), the number of transmissions is 4 (the number of repetitions is 3) and, in FIG. 8(d), the number of transmissions is 3 (the number of repetitions is 2). Unlike FIGS. 8(a) and 8(c) corresponding to Equation 3, hopping is performed to obtain high frequency diversity in a frequency band. If maximum diversity is obtained from the first retransmission using this method, reception for subsequent repetitions may not be performed. In this case, a D2D receiver may successfully perform decoding without performing reception for all repetitions configured by the network, thereby reducing battery consumption by turning off a reception circuit.

Equation 4 may be represented as Equation 5 or Equation 6.

$$nf(k)=[nf(0)+\text{mod}(k,2)*\text{floor}(Nf/2)+\text{floor}(k/2)*\text{floor}(Nf/M)]\text{modulo } Nf \quad \text{[Equation 5]}$$

The difference between Equation 4 and Equation 5 is whether the second transmission is performed in a distinctly different subband or not. If M is an even number, the two equations have no difference in operation and, if M is an odd number, the two equations have a slight difference in a hopped resource but do not show a great performance difference. However, in Equation 2, since the second transmission is performed in a distinctly different subband, if decoding is successful in two receptions, there is an advantage that subsequence packets do not need to be received.

$$nf(k)=[nf(0)+BRO(k)*\text{floor}(Nf/M)]\text{modulo } Nf \quad \text{[Equation 6]}$$

Here, BRO refers to k obtained by representing a constant k as a binary bit, reversing the binary bit in an opposite order, and then representing the reversed binary number as a corresponding constant k. According to this scheme, k=0, 1, ..., M−1. For example, when M=4, BRO (k) according to k is shown below in Table 2.

TABLE 2

| k | Binary k | BRO | BRO(k) |
|---|---|---|---|
| 0 | 00 | 00 | 0 |
| 1 | 01 | 10 | 2 |
| 2 | 10 | 01 | 1 |
| 3 | 11 | 11 | 3 |

Meanwhile, a resource pool is signaled in units of RBs. If a discovery signal is transmitted in units of two RBs, the discovery signal has a chance to deviate from the resource pool during hopping or may be discontinuously transmitted. In this case, when each discovery resource index n is defined such that discontinuous transmission does not occur, discontinuous transmission is not performed. When discovery resources are indexed in one discovery subband, indexing is sequentially performed from a low PRB index in every discovery resource size (e.g., two RBs). In this case, a maximum index in one subband becomes floor (L/2)−1. Similarly, discovery resources in the second subband are sequentially indexed from floor(L/2) by two RBs and indexing may be performed up to a maximum of 2*floor(L/2)−1.

A rule may be defined such that information about whether to apply the above-described methods (or information about rules of the proposed methods) may be indicated by an eNB to a UE through a predefined signal (e.g., a physical layer signal or a higher-layer signal).

Meanwhile, in the above-mentioned type 2B hopping pattern, the cell-specific time and/or frequency shift parameter may be determined by a cell ID but may be determined by an SSS ID among PSS/SSS IDs. Alternatively, the parameter may be configured by a random sequence generator having the SSS ID as a seed value. In addition, a random sequence may be set to a value which varies with every discovery period. This is advantageous in that use of the same shift parameter in cells in the same site can prevent hopping collision. Generally, when a macro cell is deployed as three sectors, if the different PSSs and the same SSS are configured, the three sectors may use the same shift parameter by the above method. As a modified method, the shift parameter may be linked to a value obtained by performing a floor function with respect to a value obtained by dividing a cell ID by n.

The second hopping method conforms to Equation 7 indicated below.

$$\text{next\_}nf=(nf+k)\text{modulo } Nf$$

$$\text{next\_}nt=(nt+nf+q)\text{modulo } Nt \quad \text{[Equation 7]}$$

In Equation 7, Nt is the size of subframes of a D2D resource pool (in discovery, the size of the time domain of the resource pool in one period, expressed in a subframe unit), Nf is the size of a D2D resource pool in the frequency domain, expressed in a size unit of a D2D signal (in discovery, the size of the frequency domain of the resource pool in one period, expressed in a PRB size of the discovery signal), nf is the location of a frequency resource on which the D2D signal is transmitted (an index obtained by dividing the frequency resource by the PRB size of the D2D signal), nt is a subframe index in the D2D resource pool (the location of a time resource (subframe index) in a discovery period), and k is a constant which is predetermined or is signaled by an eNB. (In order to obtain frequency diversity, k may be given as k=f(Nf)+k', wherein f(Nf) is an offset for obtaining frequency diversity and may be in form of (Nf)=Nf/x (x is a predetermined constant, for example, x=2)) Q may be a constant which is predetermined or is signaled by an eNB and may be a function of the frequency resource index nf. To solve the half duplex problem, Q may be determined to be m*floor(nf/Nt).

The above hopping method considers conditions of a cell-specific hopping pattern (the hopping pattern is differently designed according to an associated cell. This serves to prevent persistent collision between inter-cell UEs by causing D2D signals between inter-cells to have different hopping patterns), solution of the half duplex problem (it is desirable that a UE that performs transmission in the same subframe perform transmission in a different subframe at least once after a predetermined time), and determination of a subsequent hopping pattern according to the first resource location (an eNB may indicate the first transmission resource location and consider determination of a resource location in the next period).

In the above definition, k and/or q may be signaled by the eNB to the UE through a physical layer signal (e.g., (e)PDCCH) or a higher-layer signal (e.g., a signal such as an SIB or RRC). In this case, the constants may be cell-specifically signaled or may be signaled as common values irrespective of a cell. Alternatively, the constants may be determined as values linked to a cell ID without additional signaling. If only one of the two values is signaled, the other specific one may be a predetermined constant (e.g., 0, 1, or a number which is relatively prime with Nt or Nf). In this case, k and q may be predetermined according to Nt and Nf. As an embodiment, q may not be directly indicated and, if q is in the form of m*floor(nf/Nt), m may be indicated. In this case, m may be fixed to 1. As another example, if k is in the form of f(Nf)+k', k' may be signaled.

That is, the half duplex problem is solved by properly signaling q and/or k (in particular, when Nt is a factor of Nf) and a different hopping pattern per cell is configured by cell-specifically setting different constants.

If a cell-specific hopping pattern is not used, k and q may be predetermined specific values. In this case, k and q may be predetermined according to a combination of Nt and Nf. For example, k and/q may be determined in specifications according to a configurable combination of Nt and Nf. As another example, k and q may be configured as k=Nf/2+1 (or k=1) and q=floor(nf/Nt) regardless of Nt and Nf.

Upon determining k in the above proposal, if k appears as floor(Nf/2)+k', k may be selected from among values in which each of k' and floor(Nf/2)+k' is relatively prime with Nf. This serves to perform transmission in subframes of different timings in the next period by setting a frequency hopped location to a value which is relatively prime with Nf.

In the above description, the reason why q is set to floor(nf/Nt) (or m*floor(nf/Nt), wherein m is a value configurable by a network through a physical layer or higher-layer signal or a predetermined constant) is that, even if a UE simultaneously performing transmission in a specific frame performs transmission in different subframes in the next period through nt+nf, since a modulo operation is performed with respect to Nt, the UE that performs simultaneous transmission again at the same location may perform transmission at different locations. However, if Nf is a very large value (e.g., if Nf is above a square of Nt), floor(nf/Nt) may generate the same value so that there is a probability of performing transmission on the same subframe. To prevent this phenomenon, q may be set to floor(nf/Nt^2)+floor(nf/Nt^3)+ . . . +floor(nf/Nt^i). In this case, i is determined by a range in which Nt and Nf are configurable. As an example, i is selected as a maximum value from among values satisfying Nf>Nt^i. (Obviously, a larger i value may be selected. For example, a very large value may be preset as i. To completely solve the half duplex problem, i which satisfies the above inequality should be selected.) For example, Nt may be a maximum of 4 and, if Nf is set to up to Nt^3=64, i may be 2. As a modified scheme, q may be set to m*(floor(nf/Nt^2)+floor(nf/Nt^3)+ . . . +floor(nf/Nt^i)), wherein m may be configured by the network (through a physical layer or higher-layer signal) or may be a predetermined constant. As another modified scheme, q may be set to m2*floor(nf/Nt^2)+m3*floor(nf/Nt^3)+ . . . +mi*floor(nf/Nt^i)), wherein m2, m3, . . . , mi may be configured by the network or may be predetermined constants.

As another modified scheme, q may be set to floor(nf/x). In this case, x may be configured by the network (through a physical layer or higher-layer signal) or may be predetermined as a constant which is relatively prime with Nf.

Hereinafter, a hopping method is proposed when one UE transmits a D2D signal multiple times in one D2D resource period. As a simplified scheme, the D2D signal may be transmitted in consecutive subframes. A resource pool size Nt of the time domain may be given as Nt/a (where a is the number of transmissions). As a method of transmitting the D2D signal multiple times in one period, one D2D signal may be consecutively transmitted (in this case, a frequency location may be hopped by a predetermined pattern (e.g., frequency shift by Nf/2) or may be hopped by applying a frequency shift corresponding to Nf/a in every transmission. This serves to maximize frequency diversity by hopping the entire frequency region when multiple transmissions occur in one period.). In this case, a transmission index nt of a time resource is defined as units of a subframes rather than units of one subframe and the resource pool size of the time domain per period is defined as Nt'=Nt/a.

The proposed hopping pattern cannot solve the half duplex problem in specific resource configuration or may cause a problem because a large number of UEs consecutively transmit a signal in the same subframe. In terms of a system, it is desirable that configuration which cannot completely solve half duplex constraint or generates persistent in-band radiation not be set to a resource pool. As an example, upon configuring a D2D resource pool, a rule may be determined such that a resource pool in which Nt is a multiple of Nf or vice versa (including the case in which Nt=Nf) or Nt and Nf are in a multiple relationship with the square of n (e.g., Nf=m*Nt^2 where m is an arbitrary natural number) is not configured. Alternatively, even if a resource pool in which Nt and Nf are in a multiple relationship is configured by the network, a rule may be determined such that a UE applying this resource pool may not use partial RBs so that Nt and Nf of the resource pool do not satisfy a specific condition. As an example, if Nt=4 and Nf=20 are configured by the network, the UE may use only 19 Nfs without using one of 40 Nfs so as not to configure a resource pool of a multiple relationship. That is, even in a hopping pattern equation, Nt and Nf may be changed, instead of originally configured values, to Nt' and Nf' which are the largest values among values that do not satisfy a specific condition (i.e., the case in which Nt and Nf are in a multiple relationship with each other (including the case in which Nt=Nf) or Nt and Nf are in a multiple relationship with the square of n (e.g., Nf=m*Nt^2 where m is an arbitrary natural number)). Although this scheme wastes some RBs, half duplex constraint is advantageously solved. If Nt and Nf satisfies a specific condition, since an eNB cannot solve half duplex constraint, Nt and Nf may be replaced with Nt' and Nf' and unused resources may be used not to schedule a UE or may be used to schedule an additional UE to which a hopping pattern is not applied. For example, when Nt=4 and Nf=20, the eNB may empty one resource remaining after using Nf'=19 for the purpose of a public safety UE which is in an emergency situation or use the remaining resource to schedule a UE of other purposes. The above-mentioned scheme may not be applied to Nt and may be implemented only for Nf to be used as Nf'. This serves to prevent waste of a time resource.

Meanwhile, if repetition transmissions performed by the UE in one period are permitted, an intra-period hopping method and an inter-period hopping method may be differently configured. For example, the intra-period hopping method may use the above-described first hopping method of type 2B (or second hopping method of type 2B) and the inter-period hoping method may use the second hopping method (or first hopping method). In this case, in an intra-period hopping pattern, a cell-specific (time/frequency shift) parameter may be fixed to 0 or may be fixed to a specific value in all cells so that a UE receiving a D2D signal of another cell may combine signals. To apply inter-period hopping, resources in a period are indexed as virtual resource indexes and one virtual resource consists of a plurality of physical resources each including one resource in every subperiod within a period. The subperiod refers to a small period obtained by dividing one period by the number of repetitions. In this case, the second hopping method of type 2B hopping (or first hopping method of type 2B hopping) may be used for an inter-subperiod hopping pattern and the first hopping method of type 2B hopping (or second hopping method) may be used for an inter-period hopping pattern.

As another scheme, a subperiod may be formed by dividing one period by the number transmissions (in this case, one subperiod size is set to Nt'=Nt/a), an inter-subperiod hopping pattern may be predetermined (e.g., the inter-subperiod hopping pattern may use a hopping pattern which is not cell specific in order to obtain combining gain. For example, in the above hopping pattern, Nt may be replaced with Nt'=Nt/a and k and q may be set to values which are not cell specific), and first inter-period transmission (or a specific inter-subperiod transmission pattern) may conform to the proposed hopping pattern. Alternatively, the inter-subperiod hopping pattern may not be additionally defined and may conform to the proposed method. In this case, Nt may be replaced with Nt'=Nt/a in the above proposal.

Figure 9:
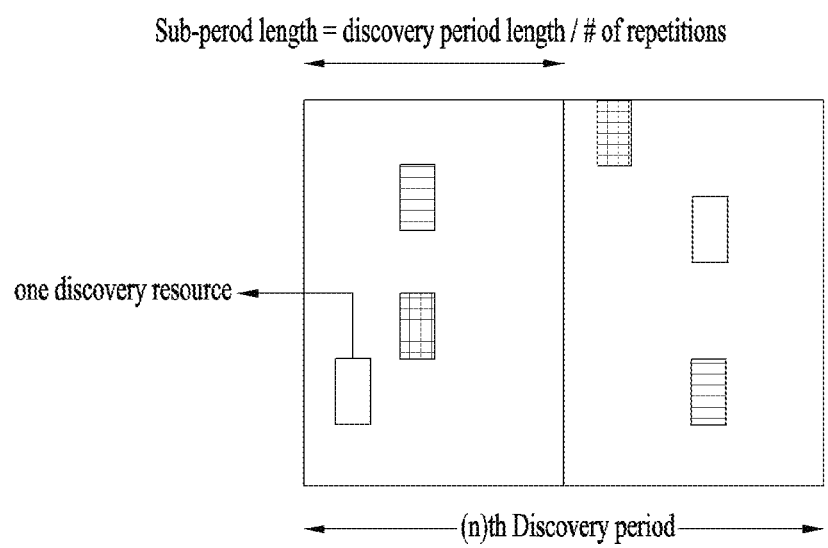

FIG. 9 illustrates exemplary inter-subperiod hopping by dividing one discovery period by a subperiod. In the example of FIG. 9, when two transmissions are permitted in a period, one period may be divided into two subperiods and an inter-subperiod hopping pattern equation may be applied. Further, a period may be divided into subperiods corresponding to the number of repetitions and one transmission may be performed in each subperiod. This method may solve half duplex constraint when a UE performing transmission in the same subframe is changed and diversity in the time domain may be acquired.

In the above description, a time resource index and a frequency resource index may indicate virtual indexes and actual physical resources may be used for permutation on virtual resource indexes. In this case, permutation may be performed with respect to one or more of time and frequency. A permutation scheme may be cell specific. For example, if the above proposed scheme or an additional time/frequency hopping pattern is not cell-specifically defined, when mapping to an actual physical resource is performed, a virtual index is changed according to a predetermined scheme and then is mapped to the physical resource. This scheme may prevent persistent collision between inter-cell UEs by performing permutation during mapping to a subsequent physical resource even though a hopping pattern is not cell-specifically configured. In addition, the hopping pattern may have the same characteristic per cell. (For example, a period necessary for discovery of all UEs may be the same in each cell.)

As an example, permutation of a time index is performed in one resource period, a time index of an m-th period is configured by the hopping scheme of the proposed method and a value, which is equal to (a value obtained by adding the time index to an offset generated by a cell ID) modulo Nt, is mapped to a physical resource and then is transmitted. Similarly even in the frequency domain, a value, which is equal to (a value obtained by adding a virtual frequency index to an offset generated by a cell ID) modulo Nf, is mapped to the physical resource.

Meanwhile, the proposed scheme may be applied to transmission of other signals. For example, the type 2B hopping pattern may be used to determine a hopping pattern upon transmission of an SA and the TRP generation scheme and hopping pattern proposed for D2D communication may be used upon transmission of a discovery signal.

Meanwhile, in the above description, the meaning that an ID is transmitted in an SA includes the meaning that a specific ID is masked in a CRC sequence of the SA and then is transmitted.

SA hopping may be indicated by Equation 8.

$$second\_nt = mod(first\_nf + first\_nt * Nf + a, Nt)$$

$$next\_nf = mod(floor((first\_nf + first\_nt * Nf)/Nt) + b, Nf) \quad \text{[Equation 8]}$$

In Equation 8, first_nt is a time index of first transmission in an SA period (0=<first_nt=<Nt−1), second_nt is a time index of second transmission in the SA period (Nt=<second_nt=<2*Nt−1), Nt is a value obtained by dividing the total number of SA time resources by 2, Nf is the total number of SA resources on a frequency axis, and a or b is a value determined by higher-layer signaling (which may be a cell specific value. For example, a may be a cell specific value and b may be 0 or a and b may be predetermined values. In out-of-coverage, a cell specific value may be preset).

In the above description, discovery transmission in a subframe may be performed on a PRB index which is less than discoveryStartPRB_{i}+discoveryNumPRB_{i} and equal to or greater than discoveryStartPRB_{i}. This serves to avoid collision between a PUCCH and a discovery signal and to perform FDM in different resource pools. This parameter may relate to a neighboring cell. Alternatively, discovery transmission in a subframe may be performed on a PRB index which is greater than discoveryEndPRB_{i}-discoveryNumPRB_{i} and equal to or less than discoveryEndPRB_{i}-. This serves to avoid collision between the PUCCH and the discovery signal and to perform FDM in different resource pool. This parameter may relate to a resource pool of a neighbor cell.

Configuration of Apparatuses According to Embodiment of the Present Invention

Figure 10:
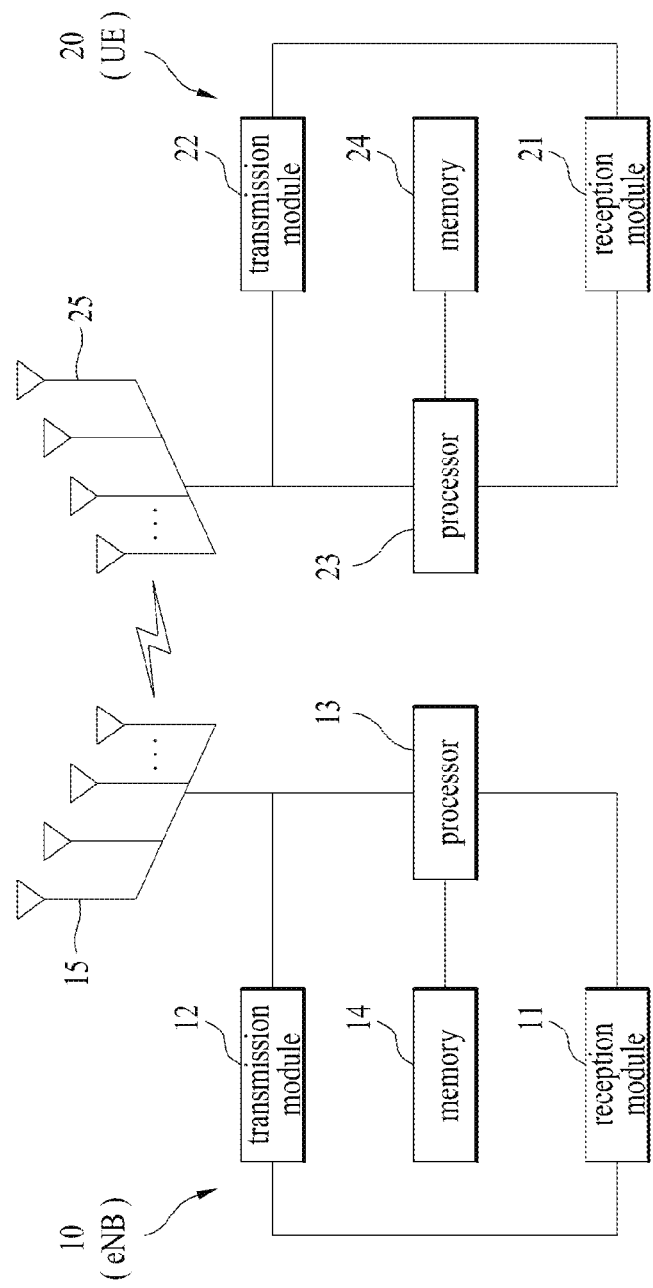
FIG. 10 is a diagram illustrating configuration of transmission and reception apparatuses.

FIG. 10 is a diagram illustrating configuration of a transmission point and a UE according to an embodiment of the present invention.

Referring to FIG. 11, a transmission point 10 according to the present invention may include a Reception (Rx) module 11, a Transmission (Tx) module 12, a processor 13, a memory 14, and a plurality of antennas 15. Use of the plurality of antennas 15 means that the transmission point 10 supports MIMO transmission and reception. The Rx module 11 may receive UL signals, data, and information from a UE. The Tx module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

The processor 13 of the transmission point 10 processes received information and information to be transmitted to the outside of the transmission point 10. The memory 14 may store the processed information for a predetermined time and may be replaced with a component such as a buffer (not shown).

Referring to FIG. 10 again, a UE 20 according to the present invention may include an Rx module 21, a Tx module 22, a processor 23, a memory 24, and a plurality of antennas 25. Use of the plurality of antennas 25 means that the UE 20 supports MIMO transmission and reception using the plurality of antennas 25. The Rx module 21 may receive DL signals, data, and information from an eNB. The Tx module 22 may transmit UL signals, data, and information to an eNB. The processor 23 may provide overall control to the UE 20.

The processor 23 of the UE 20 according to the embodiment of the present invention may perform necessary operations in the afore-described embodiments.

The processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the above-described various embodiments of the present invention may be implemented independently or in combination of two or more thereof. A redundant description is omitted for clarity.

The description of the transmission point 10 in FIG. 10 is applicable to a relay as a DL transmitter or a UL receiver, and the description of the UE 20 in FIG. 12 is applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention are applicable to various mobile communication systems.

What is claimed is:

1. A method of transmitting a discovery signal by a Device-to-Device (D2D) User Equipment (UE) in a wireless communication system, the method comprising:

determining a subframe pool in a discovery period; and transmitting the discovery signal in a subframe included in the subframe pool, wherein a frequency resource index on which the discovery signal is transmitted on the discovery period is determined by using:

($f\_shift+floor((nf+Nf*nt)/Nt))\mod Nf$ wherein a time resource index on which the discovery signal is transmitted on the discovery period is determined by using:

($t\_shift+nf+Nf*nt)\mod Nt$ where Nf is determined based on a number of discovery resources per subframe, Nt is determined based on a number of subframes per discovery period, f_shift is a frequency shift, t_shift is a subframe shift, nf is a frequency resource index on which the discovery signal is transmitted on a previous discovery period, and nt is a time resource index on which the discovery signal is transmitted on the previous discovery period, wherein f_shift and t_shift are determined from values indicated by a higher-layer parameter, and wherein f_shift varies based on the discovery period and not based on a cell ID.

2. The method according to claim 1, wherein the time resource index is a subframe index of the subframe pool.

3. The method according to claim 2, wherein the frequency resource index is a frequency resource index included in a resource block pool.

4. The method according to claim 3, wherein a frequency resource corresponding to one frequency resource index is two resource blocks.

5. The method according to claim 1, wherein the time resource index and the frequency resource index are virtual indexes.

6. The method according to claim 5, wherein permutation is performed on the virtual indexes prior to being mapped to a physical resource.

7. The method according to claim 6, wherein the permutation is performed on at least one of a virtual index regarding a time resource and a virtual index regarding a frequency resource.

8. The method according to claim 6, wherein the permutation is cell-specific permutation.

9. The method according to claim 1, wherein the subframe pool is determined by a length-N bitmap.

10. The method according to claim 9, wherein the length-N bitmap is generated by repeating a length-Nb bitmap.

11. The method according to claim 10, wherein N is a multiple of Nb.

12. A User Equipment (UE) for transmitting a Device-to-Device (D2D) signal in a wireless communication system, the UE comprising:

a transmission module; and a processor, wherein the processor is configured to determine a subframe pool in a discovery period and to transmit the discovery signal in a subframe included in the subframe pool, wherein a frequency resource index on which the discovery signal is transmitted on the discovery period is determined by using:

$$(f\_shift + \text{floor}((nf + Nf*nt)/Nt)) \bmod Nf$$

wherein a time resource index on which the discovery signal is transmitted on the discovery period is determined by using:

$$(t\_shift + nf + Nf*nt) \bmod Nt$$

where Nf is determined based on a number of discovery resources per subframe, Nt is determined based on a number of subframes per discovery period, f_shift is a frequency shift, t_shift is a subframe shift, nf is a frequency resource index on which the discovery signal is transmitted on a previous discovery period, and nt is a time resource index on which the discovery signal is transmitted on the previous discovery period, wherein f_shift and t_shift are determined from values indicated by a higher-layer parameter, and wherein f_shift varies based on the discovery period and not based on a cell ID.

* * * * *